United States Patent
Suzuki et al.

(10) Patent No.: US 12,032,435 B2
(45) Date of Patent: Jul. 9, 2024

(54) RULE GENERATION APPARATUS, RULE GENERATION METHOD, AND PROGRAM

(71) Applicant: Nippon Telegraph and Telephone Corporation, Tokyo (JP)

(72) Inventors: Satoshi Suzuki, Musashino (JP); Haruhisa Nozue, Musashino (JP); Shunsuke Kanai, Musashino (JP); Kazuaki Akashi, Musashino (JP); Fumika Asai, Musashino (JP); Naomi Murata, Musashino (JP); Kenichi Tayama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 53 days.

(21) Appl. No.: 18/009,042

(22) PCT Filed: Jun. 12, 2020

(86) PCT No.: PCT/JP2020/023122
§ 371 (c)(1),
(2) Date: Dec. 8, 2022

(87) PCT Pub. No.: WO2021/250873
PCT Pub. Date: Dec. 16, 2021

(65) Prior Publication Data
US 2023/0273850 A1   Aug. 31, 2023

(51) Int. Cl.
*G06F 11/07*    (2006.01)

(52) U.S. Cl.
CPC ........ *G06F 11/079* (2013.01); *G06F 11/0709* (2013.01); *G06F 11/0793* (2013.01)

(58) Field of Classification Search
CPC . G06F 11/079; G06F 11/0709; G06F 11/0793
See application file for complete search history.

(56) References Cited

U.S. PATENT DOCUMENTS

| | | | |
|---|---|---|---|
| 11,366,713 B2* | 6/2022 | Honnappa | G06F 11/3636 |
| 2011/0066908 A1* | 3/2011 | Bartz | H04L 41/0631 |
| | | | 714/E11.01 |

(Continued)

FOREIGN PATENT DOCUMENTS

| | | |
|---|---|---|
| JP | 5684946 | 1/2015 |
| JP | 6637854 | 12/2019 |

*Primary Examiner* — Jigar P Patel
(74) *Attorney, Agent, or Firm* — Fish & Richardson P.C.

(57) ABSTRACT

To enable more accurate determination of a failure cause event, an event mapping acquiring unit acquires an event mapping file defining a normalized alarm message indicating a normalized alarm content, a resource type indicating an event failure location, an alarm type, and an event type indicating event classification of the alarm in association with one another. An event type conversion unit determines whether input alarm information matches the definition of the event mapping file acquired, when the input alarm information matches the definition, sets the event type to a value defined in the event mapping file, when the input alarm information does not match the definition, sets the event type to the alarm type of alarm information, and registers the event type and the alarm information in association with each other as a failure event in the database.

7 Claims, 13 Drawing Sheets

(56) References Cited

U.S. PATENT DOCUMENTS

2014/0237297 A1    8/2014  Nagura et al.
2015/0378805 A1*  12/2015  Nakano .............. H04L 41/0645
                                                          714/37
2018/0239991 A1*   8/2018  Weller ................. G06F 16/907

* cited by examiner

Fig. 2

ALARM INFORMATION ~AI

| SERIAL NUMBER | ITEM NAME | DESCRIPTION | VALUE EXAMPLE |
|---|---|---|---|
| 1 | ALARM MESSAGE | CHARACTER STRING INDICATING ALARM CONTENT | AAA_PING_FAIL_XXX |
| 2 | NODE NAME | NAME OF NODE (KEY UNIQUELY IDENTIFYING NODE) | SW001a |
| 3 | RESOURCE TYPE | TYPE INDICATING IN WHICH PART OF APPARATUS HOUSING FAILURE EVENT HAS OCCURRED | chassis, card, port |
| 4 | ALARM TYPE | TYPE OF ALARM (SET IN ADVANCE BY USER) | PingMonitor(P001) |

Fig. 3

EVENT MAPPING FILE ∼IMF

| SERIAL NUMBER | ITEM NAME | DESCRIPTION | VALUE EXAMPLE |
|---|---|---|---|
| 1 | NORMALIZED ALARM MESSAGE | NORMALIZED CHARACTER STRING INDICATING ALARM CONTENT | (NORMALIZED CHARACTER STRING) + PING_FAIL + (NORMALIZED CHARACTER STRING) |
| 2 | RESOURCE TYPE | TYPE INDICATING IN WHICH PART OF APPARATUS HOUSING FAILURE EVENT HAS OCCURRED | chassis, card, port |
| 3 | ALARM TYPE | TYPE OF ALARM (SET IN ADVANCE BY USER) | PingMonitor(P001) |
| 4 | EVENT TYPE | TYPE INDICATING EVENT CLASSIFICATION OF ALARM | PING_FAIL_a |

Fig. 4

EVENT DB 15

| SERIAL NUMBER | ITEM NAME | DESCRIPTION | VALUE EXAMPLE |
|---|---|---|---|
| 1 | ALARM MESSAGE | CHARACTER STRING INDICATING ALARM CONTENT | AAA_PING_FAIL_XXX |
| 2 | NODE NAME | NAME OF NODE (KEY UNIQUELY IDENTIFYING NODE) | SW001a |
| 3 | RESOURCE TYPE | TYPE INDICATING IN WHICH PART OF APPARATUS HOUSING FAILURE EVENT HAS OCCURRED | chassis, card, port |
| 4 | ALARM TYPE | TYPE OF ALARM (SET IN ADVANCE BY USER) | PingMonitor(P001) |
| 7 | EVENT TYPE | TYPE INDICATING EVENT CLASSIFICATION OF ALARM | PING_FAIL_a |

Fig. 9

| SERIAL NUMBER | VALUE EXAMPLE |
|---|---|
| 1 | TEMPERATURE_CRITICAL |
| 2 | TEMPERATURE_WARNING |
| 3 | TEMPERATURE_INFO |
| 4 | LINK_DOWN |
| 5 | CHANGE_STATE |
| 6 | PING_FAIL |
| ⋮ | ⋮ |

Fig. 10

| ITEM NUMBER | FUNCTION | APPLICATION EXAMPLE |
|---|---|---|
| 1 | ADD EVENT MAPPING | - SUBDIVIDE EVENT |
| 2 | DELETE EVENT MAPPING | - AGGREGATE EVENT |
| 3 | EDIT EVENT MAPPING | - CHANGE EVENT TYPE<br>- CHANGE RESOURCE TYPE | ced to each other in a network environment, and when
RULE GENERATION APPARATUS, RULE GENERATION METHOD, AND PROGRAM

CROSS-REFERENCE TO RELATED APPLICATIONS

This application is a National Stage application under 35 U.S.C. § 371 of International Application No. PCT/JP2020/023122, having an International Filing Date of Jun. 12, 2020, the disclosure of which is considered part of the disclosure of this application, and is incorporated by reference in its entirety into this application.

TECHNICAL FIELD

The present disclosure relates to a rule generation apparatus, a rule generation method, and a program.

BACKGROUND ART

A plurality of network devices of different types are connected to each other in a network environment, and when various types of multiple alarms (hereinafter, referred to as "alarm set") are issued due to failure, determining the cause of the failure as soon as possible is important for recovering from the failure.

A technique for creating an IF-THEN rule that determines the factor of a certain failure using an event caused by the failure in a network device to be monitored (hereinafter, referred to as "failure event", and one alarm corresponds to one event) has been proposed (for example, PTLS 1 and 2).

The technique disclosed in PTL 1 creates, when the IF-THEN rule is created, a condition part (IF part) and a failure cause event (THEN part) to be defined in the rule are created upon receiving an input from an operator. In the rule creation, one failure event in the condition part of the rule is defined as a cause event, that is, a conclusion part.

The technique disclosed in PTL 2 can handle a failure case that cannot be handled with the technique disclosed in PTL 1, that is, a failure case where the cause of the failure does not directly trigger the failure event. The technique disclosed in PTL 2 is specifically achieved with a database and a unique determination unit provided. In the database, information on a cause of a failure, a failure event caused by this failure, and a rule ID (ID that uniquely determines a rule) associated with a rule including a condition part and a conclusion part are registered in association with each other. The unique determination unit generates all combinations of failure events for a new failure, and extracts, for each failure, a unique pattern for determining a combination with the lowest occurrence rate among the combinations of the failure events of new failures and combinations of failure events of past failures that have occurred in the past. The unique determination unit generates and corrects a rule using the unique pattern corresponding to each failure.

CITATION LIST

Patent Literature

PTL 1: JP 5684946 B
PTL 2: JP 6637854 B

SUMMARY OF THE INVENTION

Technical Problem

In the technique in the prior art including the technique disclosed in PTL 2, the event definition of the content of the IF part that is the condition part, corresponding to the alarm classification for associating an alarm used within the rule, is fixed in the IF-THEN rule for determining the cause of a failure, meaning that the definition is not supposed to be changed during use. Thus, in a case where the event definition is required for various failure cases, the definition cannot be updated to the exact event definition. Specifically, this causes that an alarm that is supposed to be included in the condition part is not included, or the alarm is used under an inappropriate classification, and consequently, an appropriate rule fails to be applied. Thus, this is one of the factors that takes a large amount of time for an operator to determine the condition.

The present disclosure has been made in view of the foregoing circumstances, and an object of the present disclosure is to provide a rule generation apparatus, a rule generation method, and a program that determine a failure cause event more accurately.

Means for Solving the Problem

An aspect of the present invention includes: a database in which, for an individual failure, failure factor information including a failure location and a failure factor, a failure event caused by the individual failure, and a rule ID associated with a rule including a condition part and a conclusion part are registered in association with each other; a unique determination unit that generates at least one every possible combination between a plurality of failure events associated with a new failure which is a newly generated failure, and every time when the new failure occurs, extracts a unique pattern determined to be a combination with the lowest occurrence rate from the combination of the plurality of failure events associated with the new failure and the failure event associated with at least one past failure that have occurred in the past; a rule generation and correction unit that generates or corrects the rule depending on the unique pattern corresponding to each failure; an event mapping file acquiring unit that acquires an event mapping file defining a normalized alarm message indicating a normalized alarm content, a resource type indicating an event failure location, an alarm type, and an event type indicating event classification of the alarm in association with each other; and an event type conversion unit that determines whether input alarm information matches a definition of the event mapping file acquired by the event mapping file acquiring unit, when the input alarm information matches the definition, sets the event type to a value defined in the event mapping file, when the input alarm information does not match the definition, sets the event type to the alarm type of alarm information, and causes the rule generation and correction unit to register the event type and the alarm information in association with each other as a failure event in the database.

Effects of the Invention

According to an aspect of the present invention, a failure cause event can be determined more accurately.

BRIEF DESCRIPTION OF DRAWINGS

FIG. 2 is a table illustrating an example of an item configuration of alarm information according to the embodiment.

FIG. 3 is a table illustrating an example of an item configuration of an event mapping file according to the embodiment.

FIG. 4 is a table illustrating an example of an item configuration of event information stored in an event database according to the embodiment.

FIG. 9 is a table illustrating an example of a definition file for the event types according to the embodiment.

FIG. 10 is a table listing modes of conversion functions on the event mapping file according to the embodiment.

DESCRIPTION OF EMBODIMENTS

An embodiment of a case where the present disclosure is applied to a rule generation apparatus installed in a multiple-network-connection environment will be described below.

Configuration

Figure 1:
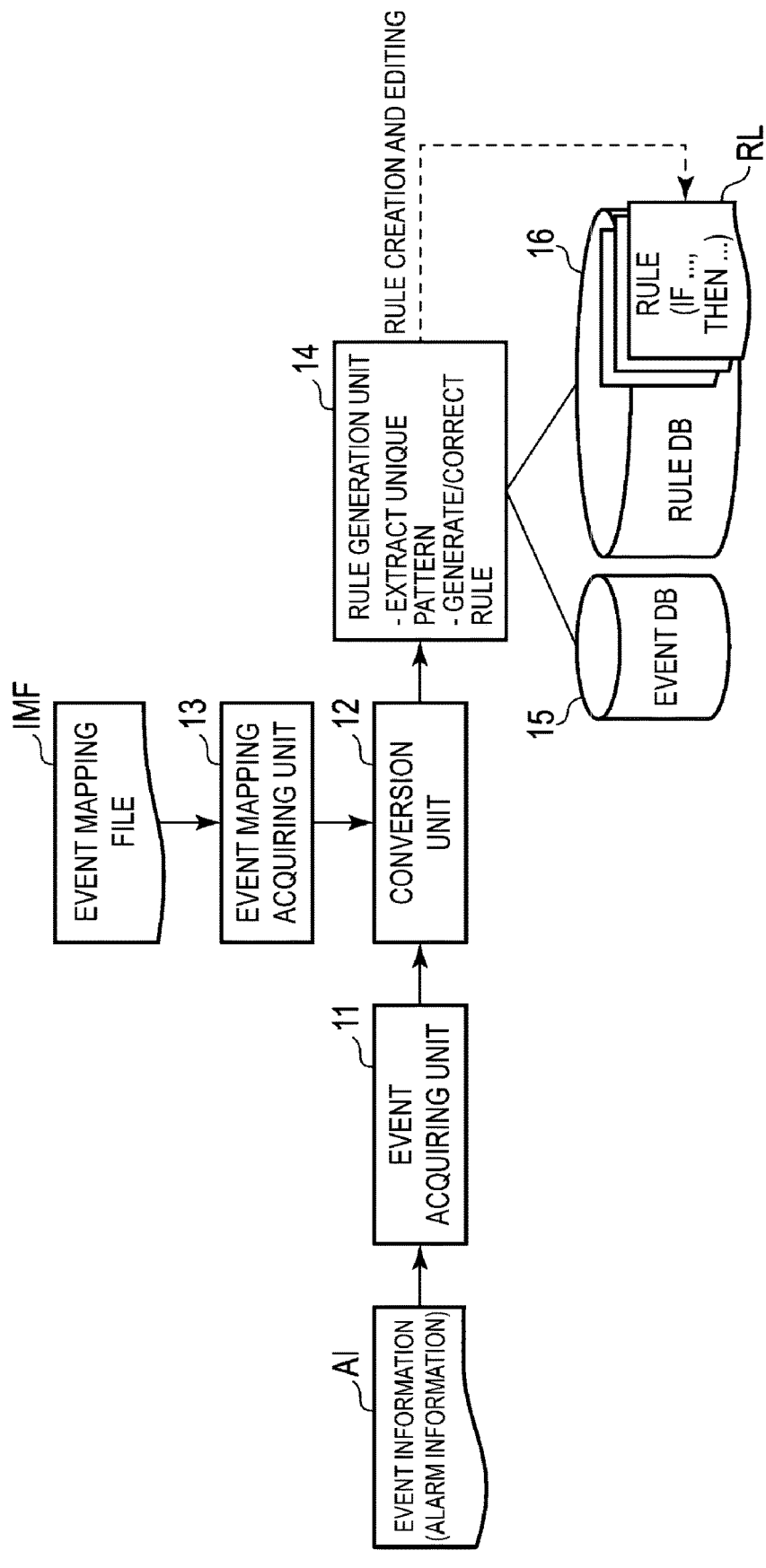
FIG. 1 is a block diagram illustrating an overall configuration of a rule generation unit according to an embodiment of the present disclosure.

FIG. 1 is a block diagram illustrating an overall configuration of a rule generation apparatus according to an embodiment of the present disclosure. The rule generation apparatus includes an event acquiring unit 11, a conversion unit 12, an event mapping acquiring unit 13, a rule generation unit 14, an event database (DB) 15, and a rule database (DB) 16, as illustrated. The event acquiring unit 11 acquires event information AI for a newly generated failure event (also referred to as a "new failure") and outputs the event information AI to the conversion unit 12. In the present embodiment, the event information AI is also referred to as alarm information AI involving alarm notification.

FIG. 2 is a table illustrating an example of an item configuration of the alarm information AI acquired by the event acquiring unit 11. As illustrated, the alarm information includes items including an alarm message, a node name, a reset type, and an alarm type. The alarm message is a character string indicating the alarm content (for example, "AAA_PING_FAIL_XXX"). The node name is the name of the node (for example, "SW001a") that is a key uniquely identifying the node. The resource type is a type (for example, "chassis", "card", or "port") indicating in which part of an apparatus housing the failure event has occurred. The alarm type is a type of the alarm (for example, "PingMonitor (P0001)") and is set in advance by a user (operator).

Note that the alarm information AI also includes other items such as a timestamp or an object identifier (OID), which are not directly related to the present embodiment, and thus those will be omitted from the description.

The event mapping acquiring unit 13 acquires and stores an event mapping file IMF externally defining, according to the event type, the definition of each event used as the condition part of the rule, and then the conversion unit 12 refers to the event mapping file IMF.

FIG. 3 is a table illustrating an example of an item configuration of the event mapping file IMF. The event mapping file IMF includes items including a normalized alarm message, a resource type, an alarm type, and an event type. The normalized alarm message is a normalized character string indicating the alarm content (for example, "(normalized character string)+PING_FAIL+(normalized character string)") for summarizing alarm messages handled in various networks. The resource type is a type (for example, "chassis", "card", or "port") indicating in which part of the apparatus housing the failure event has occurred. The alarm type is a type of the alarm (for example, "PingMonitor (P0001)") and is set in advance by a user (operator). The event type is a type (for example, "PING_FAIL_a") indicating the event classification of the alarm.

The conversion unit 12 appropriately corrects the event type of event information AI depending on whether the event type of alarm information AI acquired by the event acquiring unit 11 matches the event mapping file IMF acquired and stored by the event mapping acquiring unit 13, and then outputs the modified event type to the rule generation unit 14, and the conversion unit 12 also updates the content of the event mapping file IMF stored by the event mapping acquiring unit 13.

The rule generation unit 14 is connected to the event database (DB) 15 and the rule database (DB) 16. The rule generation unit 14 generates at least one every possible combinations between failure events associated with new failures and registers the combinations in the event database 15. Then, each time the new failure occurs, the rule generation unit 14 extracts a unique pattern that is determined to be the combination with the lowest occurrence rate from the combinations of the failure events of the new failures and the failure events of one or more past failures that have occurred in the past and stored in the event database 15. Then, as necessary, the rule generation unit 14 newly generates or corrects rule information RL to be stored in the rule database 16, the rule information RL including the unique pattern corresponding to each failure as a condition part and failure factor information as a conclusion part.

FIG. 4 is a table illustrating an example of an item configuration of event information stored in the event database 15. As illustrated, the event information includes items including an alarm message, a node name, a reset type, an alarm type, and an event type. The alarm message is a character string indicating contents of the alarm (for example, "AAA_PING_FAIL_XXX"). The node name is the name of the node (for example, "SW001a") that is a key uniquely identifying the node. The resource type is a type (for example, "chassis", "card", or "port") indicating in which part of the apparatus housing the failure event has occurred. The alarm type is a type of the alarm (for example, "PingMonitor (P0001)") and is set in advance by a user (operator). The event type is a type (for example, "PING_FAIL_a") indicating the event classification of the alarm.

The rule information RL stored in the rule database 16 has a configuration in which a rule name, a failure event which is the condition part (IF part) of the IF-THEN rule, and failure factor information including a failure location and a failure factor which are the conclusion part (THEN part) of the rule are associated with each other.

Operations

Operations of processing executed by the conversion unit 12 in correspondence with the event information AI of one or more new failure events using the definition of the event mapping file IMF will be described.

Figure 5:
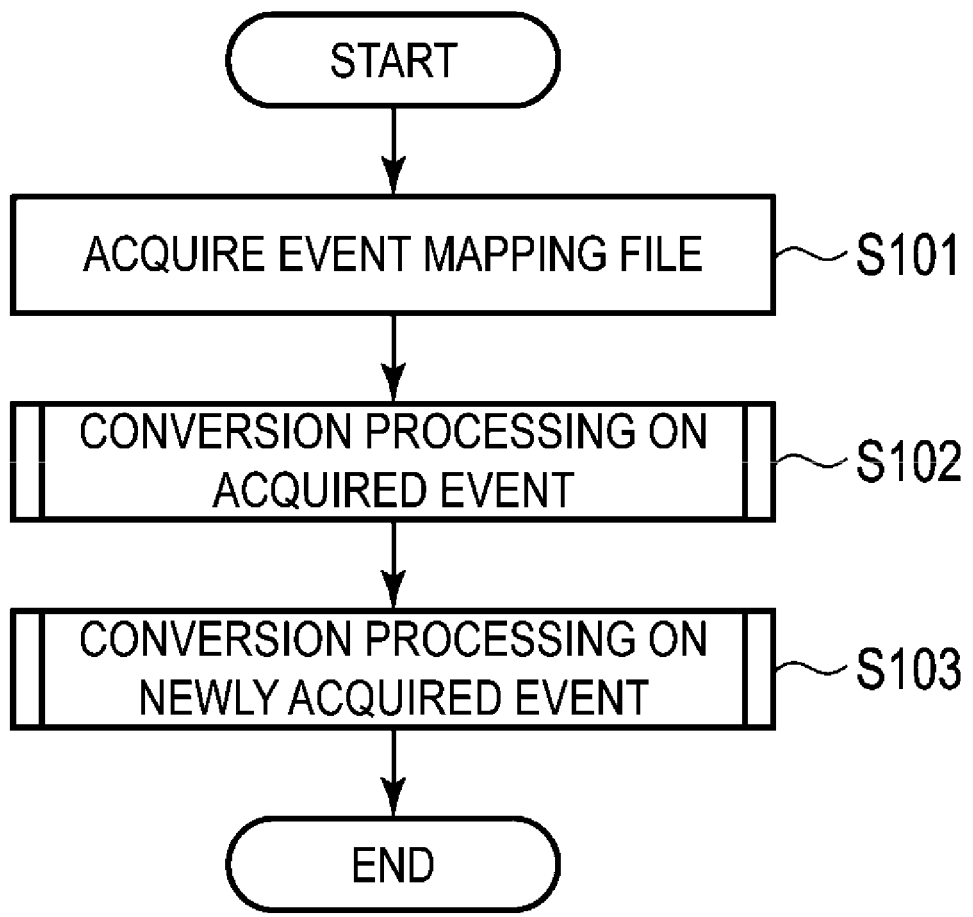
FIG. 5 is a flowchart illustrating contents of the entire processing executed by a conversion unit and illustrating the processing content according to the embodiment.

FIG. 5 is a flowchart illustrating the content of the entire processing executed by the conversion unit 12 when the event acquiring unit 11 acquires one or more pieces of event information AI as the new failure event.

First of all, the conversion unit 12 causes the event mapping acquiring unit 13 to acquire and store the event mapping file IMF (step S101).

The conversion unit 12 executes conversion processing on the event type of past failure event that has been stored in the event database 15 based on the event mapping file IMF acquired by the event mapping acquiring unit 13 (step S102).

Figure 6:
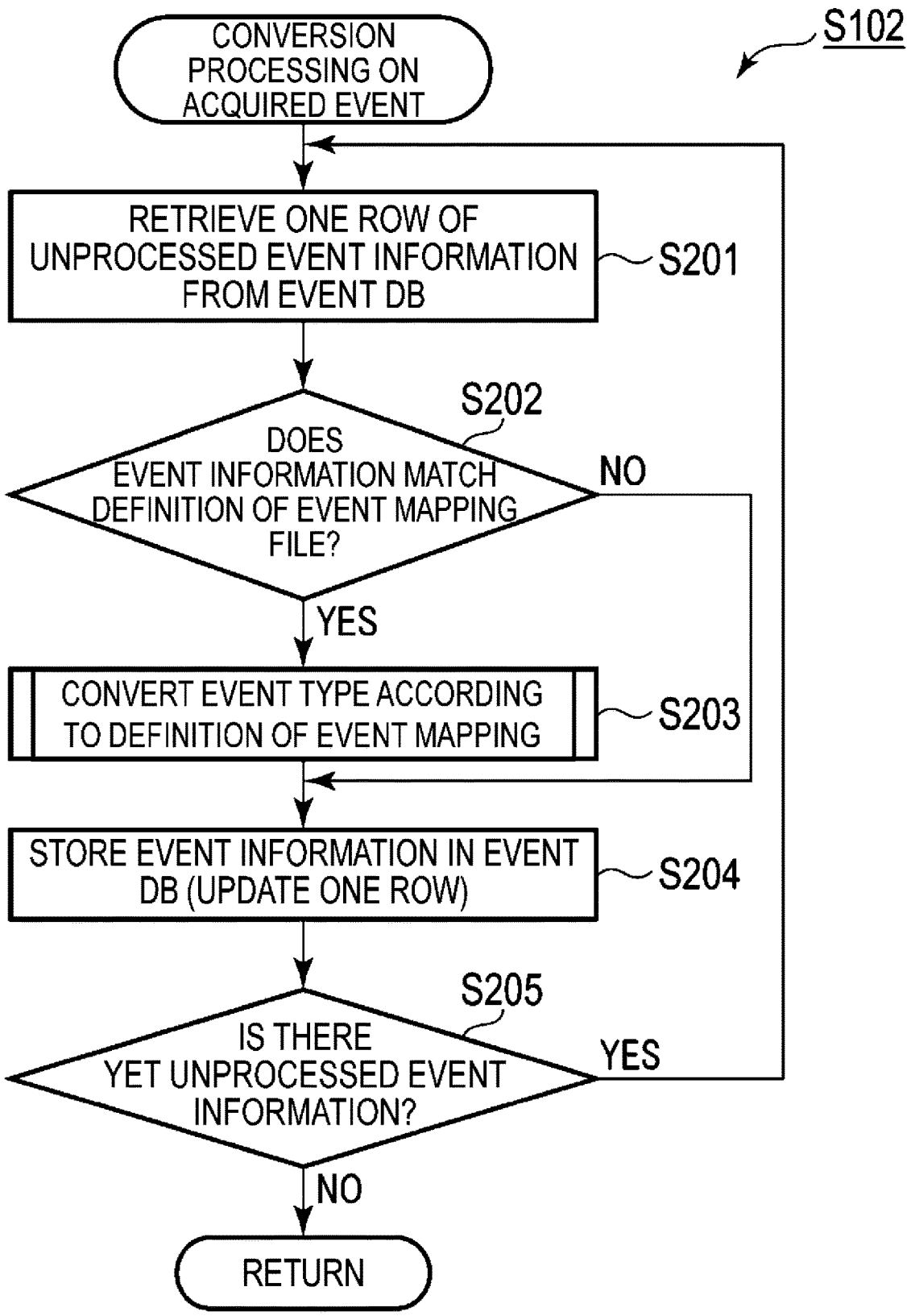
FIG. 6 is a flowchart of a sub-routine and illustrates detailed contents of event type conversion processing for acquired event information illustrated in FIG. 5 according to the embodiment.

FIG. 6 is a flowchart of a sub-routine illustrating a detailed processing content of the conversion processing on the event type for the acquired past event information.

First, the conversion unit 12 causes the rule generation unit 14 to retrieve one row of the unprocessed event information from the event database 15 (step S201).

The conversion unit 12 determines whether the event information thus retrieved matches the definition of the event mapping file IMF acquired by the event mapping acquiring unit 13 (step S202).

When the past event information retrieved is determined to match the definition of the event mapping file IMF acquired by the event mapping acquiring unit 13 (YES in step S202), the conversion unit 12 converts the event type in the event information retrieved, according to the definition of the event mapping file IMF (step S203). Details of the content of the processing for converting the event information will be described later.

The conversion unit 12 causes the rule generation unit 14 to store the past event information with the event type converted in the event database 15 once again, and thus updates the event information (step S204).

When the past event information retrieved is determined not to match the definition of the event mapping file IMF acquired by the event mapping acquiring unit 13 in step S202 (NO in step S202), the conversion unit 12 causes the rule generation unit 14 to directly store the event information in the event database 15 without executing the conversion processing in step 203 for converting event types in the event information, to update the event information (step S204).

In this way, after the update processing of the event type of event information stored in the event database 15 is executed as necessary depending on whether the past event information retrieved from the event database 15 matches the definition of the event mapping file IMF, the conversion unit 12 determines whether the event database 15 still stores unprocessed event information (step S205).

Upon determining that the event database 15 still stores unprocessed past event information (NO in step S205), the conversion unit 12 returns to the processing in step S201 and executes the same processing on the unprocessed past event information stored in the event database 15.

In this manner, the processing in steps S201 to S205 is repeated to execute the event type conversion processing on the unprocessed past event information remaining in the event database 15, according to whether the event information matches the definition of the event mapping file IMF.

Upon determining that the event database 15 does not store unprocessed past event information in step S205 (YES in step S205), the conversion unit 12 determines that there is no unprocessed past event information stored in the event database 15 anymore and ends the sub-routine in FIG. 6 to return to the main routine in FIG. 5.

Then, in the main routine of FIG. 5, the conversion unit 12 collectively acquires one or more pieces of event information newly input (step S301).

The conversion unit 12 retrieves one row of unprocessed event information in the one or more pieces of new event information acquired (step S302).

The conversion unit 12 determines whether the event information thus retrieved matches the definition of the event mapping file IMF acquired by the event mapping acquiring unit 13 (step S303).

When the new event information retrieved is determined to match the definition of the event mapping file IMF acquired by the event mapping acquiring unit 13 (YES in step S303), the conversion unit 12 converts the event type in the event information retrieved, based on the definition of the event mapping file IMF (step S304). Details of the content of the processing for converting the event information will be described later.

The conversion unit 12 causes the rule generation unit 14 to store the past event information with the event type converted in the event database 15, and thus updates the event information registered in the event database 15 (step S305).

When the new event information retrieved is determined not to match the definition of the event mapping file IMF acquired by the event mapping acquiring unit 13 in step S303 (NO in step S303), the conversion unit 12 causes the rule generation unit 14 to directly and newly store the event information in the event database 15 without executing the conversion processing in step 304 for converting event types in the event information, to update the event information registered in the event database 15 (step S305).

After thus updating the event information with the event type converted registered in the event database 15 as necessary depending on whether the newly acquired event information matches the definition of the event mapping file IMF, the conversion unit 12 determines whether unprocessed new event information remains (step S306).

Upon determining that unprocessed new event information acquired is still remaining (NO in step S306), the conversion unit 12 returns to the processing in step S302 and executes the same processing on the unprocessed new event information acquired by the event acquiring unit 11.

In this manner, the processing in steps S302 to S306 is repeated to execute the event type conversion processing on the new unprocessed event information acquired by the event acquiring unit 11, according to whether the event information matches the definition of the event mapping file IMF.

Figure 7:
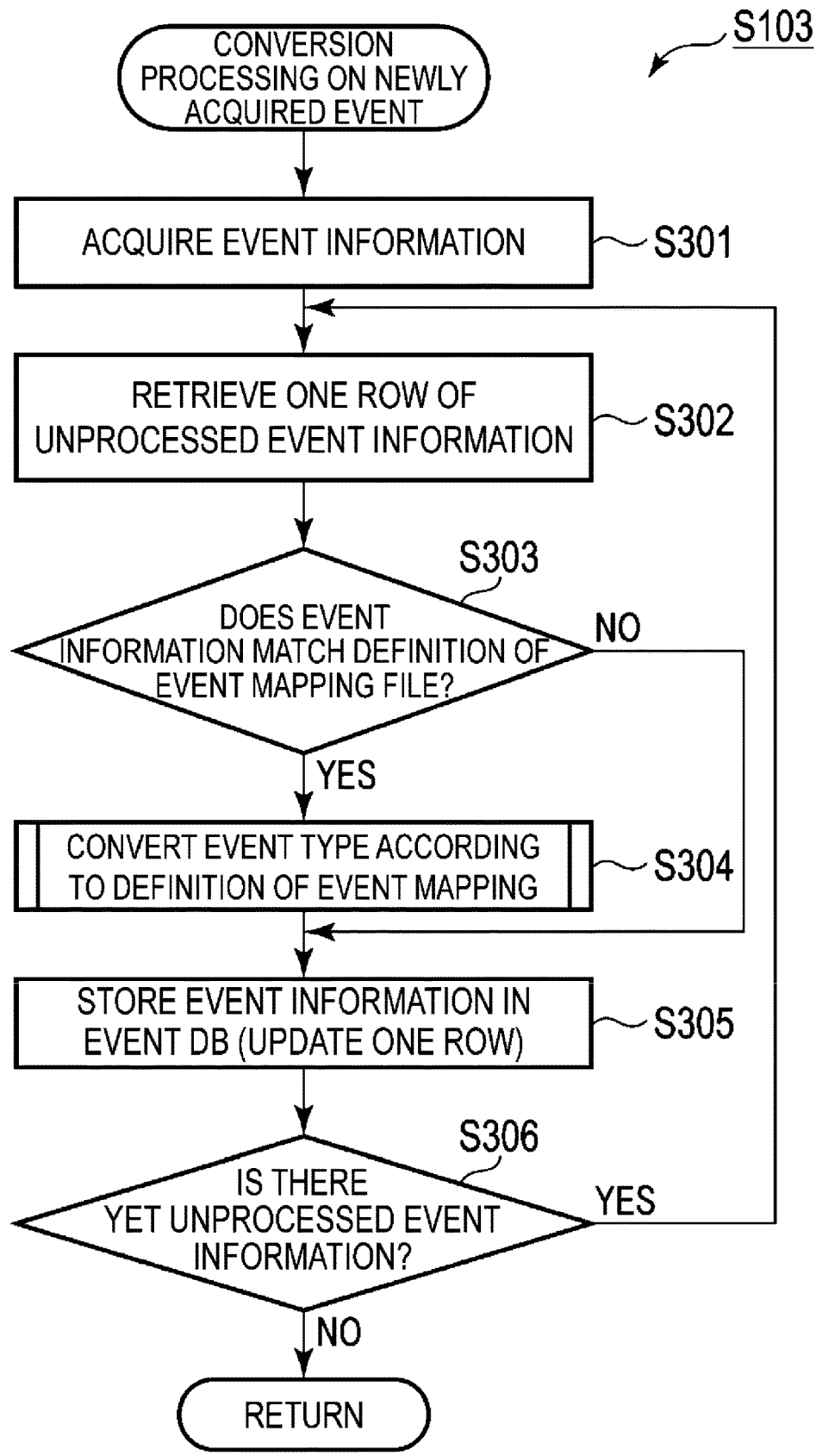
FIG. 7 is a flowchart of a sub-routine and illustrates detailed processing contents of event type conversion processing for newly acquired event information illustrated in FIG. 5, illustrating the processing content according to the embodiment.

Upon determining in step S306 that unprocessed new event information acquired by the event acquiring unit 11 is not remaining (YES in step S306), the conversion unit 12 determines that no new unprocessed event information is acquired by the event acquiring unit 11 and ends the sub-routine in FIG. 7 as well as the processing in the main routine in FIG. 5.

Figure 8:
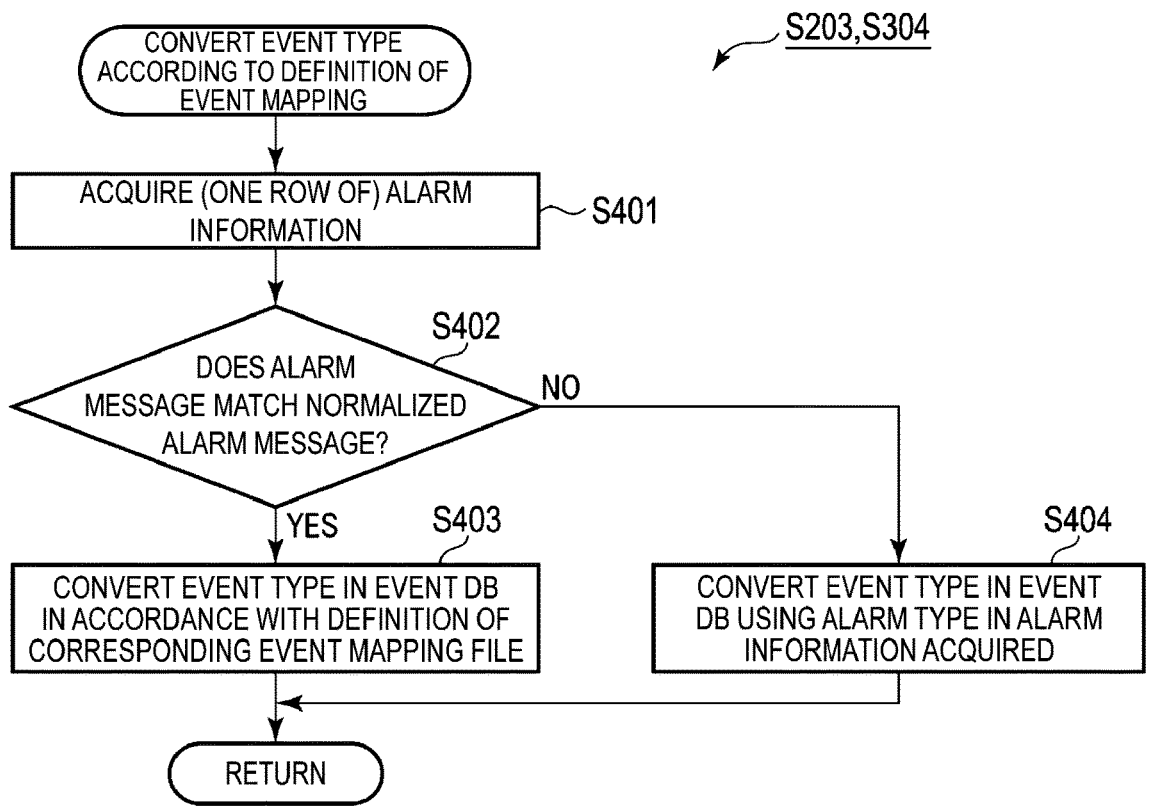
FIG. 8 is a flowchart of a sub-routine illustrating details of event type conversion processing in accordance with the definition of the event mapping file in FIGS. 6 and 7 according to the embodiment.

FIG. 8 is a flowchart of a sub-routine illustrating details of the conversion processing on the event type in the past and new event information based on the definition of the event mapping file IMF, in step S203 in FIG. 6 and step S304 in FIG. 7.

The conversion unit 12 first acquires one row of alarm information (event information) (step S401). The conversion unit 12 determines whether the alarm message in the acquired alarm information matches the normalized alarm message of the event mapping file IMF (step S402).

Upon determining that the alarm message in the alarm information acquired matches the normalized alarm message of the event mapping file IMF (YES in step S402), the conversion unit 12 converts the event type in the event information stored in the event database 15 in accordance with the event type defined by the corresponding event mapping file IMF (step S403), and ends the conversion processing in FIG. 8 to return to the processing in FIG. 6 or 7.

Upon determining that the alarm message in the alarm information acquired does not match the normalized alarm message of the event mapping file IMF in step S402 (NO in step S402), the conversion unit 12 converts the event type in the event information stored in the event database 15, in accordance with the alarm type in the alarm information acquired (step S404), and ends the conversion processing in FIG. 8 to return to the processing in FIG. 6 or 7.

For the event type in the event mapping file IMF acquired by the event mapping acquiring unit 13, the following two types of methods are proposed. Specifically, either one of
1. a method of describing the event type as appropriate, or
2. a method of selecting the event type from those determined in advance, in accordance with a definition file for the event type described later is performed.

FIG. 9 is a diagram illustrating an example of the definition file for the event type used in the method 2. In FIG. 9, various failure statuses related to a temperature (TEMPERATURE), a failure status indicating a disconnected link (LINK), and the like are defined.

When the method 2 is used, even when the event information AI is to be newly acquired in a plurality of networks, the event mapping file IMF for externally defining the event type is generalized by using the common event type, and the event mapping file IMF can be commonly used between different networks.

Next, a function of changing, by the conversion unit 12, the definition of the event mapping file IMF acquired by the event mapping acquiring unit 13 will be described. FIG. 10 lists the modes of functional change on the event mapping file IMF by the conversion unit 12. The conversion unit 12 enables adding, deleting, and editing of the event mapping file IMF.

The event mapping file IMF is added specifically by subdividing the event types. The event mapping file IMF is aggregated specifically by aggregating the event types. The event mapping file IMF is edited specifically by changing the event type or changing the resource type.

Figure 11:
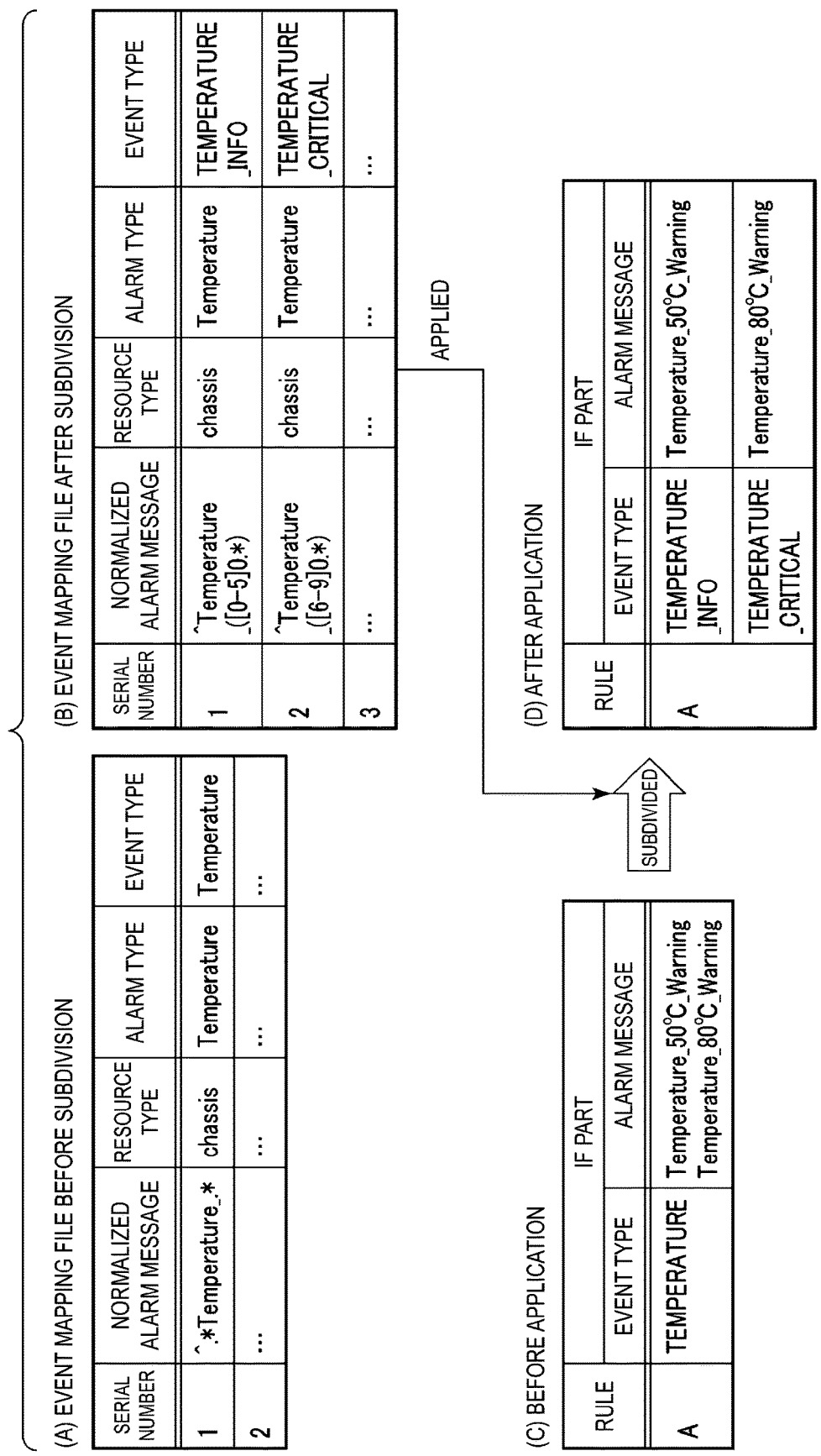
FIG. 11 is a diagram illustrating a case where an event is subdivided, as a first example of the embodiment.

FIG. 11 is a diagram illustrating a case where an event used as a condition part (IF part) of a certain rule is subdivided, as a first example of the present embodiment. FIG. 11(A) illustrates an example of the event mapping file IMF before the event type is subdivided. Here, an example of a state where a plurality of alarm messages are mapped on an event type "Temperature" is illustrated. Note that the normalized expression in FIG. 11(A) is an example. Similarly, the normalized expressions appearing below are indicated as an example.

FIG. 11(B) illustrates an example of the event mapping file IMF after the event type has been subdivided. An example is shown in which the events used for the condition part of the rule are subdivided in accordance with temperature ranges (0 to 50 [° C.]/60 to 90 [° C.]) and different event types are set for the respective events (TEMPERATURE_INFO/TEMPERATURE_CRITICAL).

Thus, the event used for the condition part of the rule A before the application illustrated in FIG. 11(C) is subdivided by applying the event mapping file IMF illustrated in FIG. 11(B). As a result, as can be seen in the state after the application illustrated in FIG. 11(D), a more accurate rule can be applied as events for which different alarm messages are issued.

Figure 12:
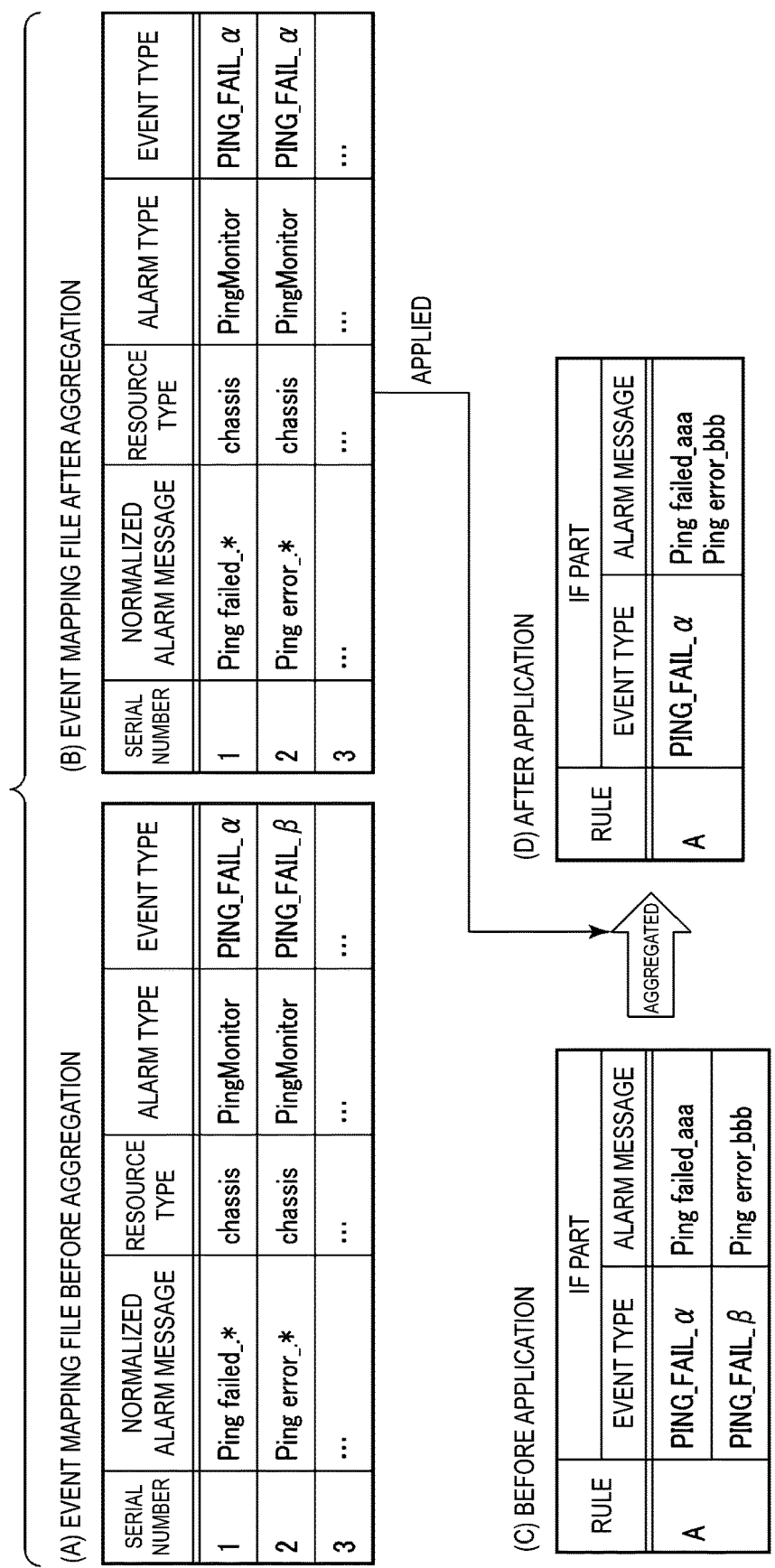
FIG. 12 is a diagram illustrating a case where events are aggregated, as a second example of the embodiment.

The event mapping file IMF is aggregated specifically by aggregating the event types. FIG. 12 is a diagram illustrating a case where events used as a condition part (IF part) of a certain rule are aggregated, as a second example of the present embodiment. FIG. 12(A) illustrates an example of the event mapping file IMF before event types are aggregated. In the state illustrated as an example, different alarm messages are mapped for an event type "PING_FAIL_$\alpha$" with a serial number "1" and an event type "PING_FAIL_$\beta$" with a serial number "2".

FIG. 12(B) illustrates an example of the event mapping file IMF after the event types have been aggregated. In the example illustrated, the event mapping files with the serial numbers "1" and "2" are collectively defined as the event type "PING_FAIL_$\alpha$".

In this manner, events used for the condition part of the rule A before the application illustrated in FIG. 12(C) are aggregated. As a result, as can be seen in the state after the application illustrated in FIG. 12(D), a more accurate rule can be applied.

Figure 13:
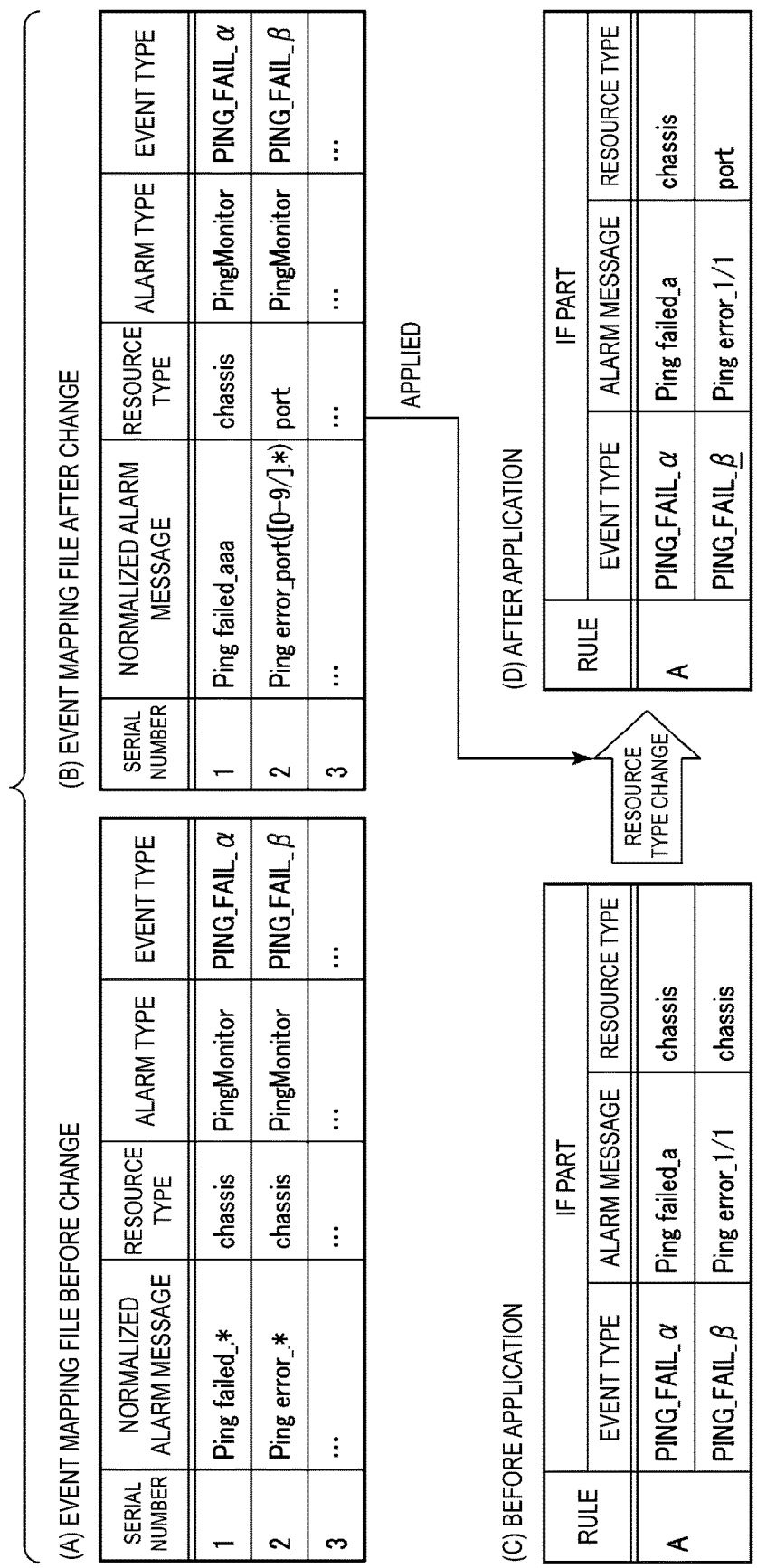
FIG. 13 is a diagram illustrating a case where events are edited, as a third example of the embodiment.

FIG. 13 is a diagram illustrating a case where events used as a condition part (IF part) of a certain rule are edited (resource type is changed), as a third example of the present embodiment. FIG. 13(A) illustrates an example of a state before the change, where "chassis" is the resource type of event mapping file with the serial number "2" to which the event type "PING_FAIL_$\beta$" is mapped.

FIG. 13(B) illustrates the event mapping file IMF after the change. The resource type of event mapping file with the serial number "2" is changed to "port".

As a result, a more accurate rule is obtained with the resource type (a part where identification has occurred) of an event used for the condition part of the rule A before the application illustrated in FIG. 13(C) changed from "chassis" to "port" as can be seen in the state after the application illustrated in FIG. 13(D).

As described above, when the event mapping file IMF is changed by the conversion unit 12, the rule generation unit 14 updates and sets, as appropriate, the event information stored in the event database 15 and the rule stored in the rule database 16 at the timing of the change, based on the event mapping file IMF changed.

As described above, as a result of changing the event mapping file IMF, the definition of the failure event can be updated as appropriate based on a failure case, whereby a more accurate rule can be generated.

Effects of Embodiment According to the present embodiment described in detail above, an event definition can be updated as appropriate by changing an event mapping file as a result of externally defining a failure event, whereby a failure cause event can be more accurately determined. Furthermore, the load on an operator can be reduced, and recovery from a network failure can be swiftly achieved.

The apparatus of the present disclosure can also be implemented by a computer and a program, and the program can be recorded in a recording medium or provided through a network.

Note that the disclosure of the present application is not limited to the aforementioned embodiment, and various modifications can be made without departing from the gist in the stage of implementation. Furthermore, the above embodiment includes the disclosure in various stages, and various disclosures can be extracted from appropriate combinations of a plurality of disclosed constituent elements. For example, a configuration in which some constituent elements are removed from all the constituent elements illustrated in the embodiment can be designed as a disclosure if the problems described in Technical Problem can be solved and the effects described in Effects of the Invention can be extracted.

REFERENCE SIGNS LIST

11 Event acquiring unit
12 Conversion unit
13 Event mapping acquiring unit
14 Rule generation unit
15 Event database (DB)
16 Rule database (DB)
AI Event information (alarm information)
IMF Event mapping file
RL Rule

The invention claimed is:

1. A rule generation apparatus comprising:
a database in which, for an individual failure, failure factor information including a failure location and a failure factor, a failure event caused by the individual failure, and a rule name associated with a rule including a condition part and a conclusion part are registered in association with each other;
a unique determination unit, implemented using one or more computing devices, configured to:
generate at least one possible combination between a plurality of failure events associated with a new failure which is a newly generated failure, and
based on the new failure having occurred, extract a unique pattern determined to be a combination with a lowest occurrence rate from the combination of the plurality of failure events associated with the new failure and a failure event associated with at least one past failure that has occurred;
a rule generation and correction unit, implemented using one or more computing devices, configured to generate or correct the rule according to the unique pattern corresponding to each failure;
an event mapping file acquiring unit, implemented using one or more computing devices, configured to acquire an event mapping file defining a normalized alarm message indicating a normalized alarm content, a resource type indicating an event failure location, an alarm type, and an event type indicating event classification of the alarm in association with each other; and
an event type conversion unit, implemented using one or more computing devices, configured to:
determine whether input alarm information matches a definition of the event mapping file acquired by the event mapping file acquiring unit,
based on the input alarm information matching the definition, set the event type to a value defined in the event mapping file,
based on the input alarm information not matching the definition, set the event type to the alarm type of alarm information, and
cause the rule generation and correction unit to register the event type and the alarm information in association with each other as a failure event in the database.

2. The rule generation apparatus according to claim 1, wherein the event type in the event mapping file acquired by the event mapping file acquiring unit is selected from a predetermined definition file.

3. The rule generation apparatus according to claim 1, wherein the event type conversion unit changes the definition of the event mapping file, and
wherein the rule generation and correction unit updates a registered content in accordance with the event mapping file with the changed definition.

4. A rule generation method comprising:
registering, in a database for an individual failure, failure factor information including a failure location and a failure factor, a failure event caused by the individual failure, and a rule name associated with a rule including a condition part and a conclusion part in association with each other;
generating at least one possible combination between a plurality of failure events associated with a new failure which is a newly generated failure;
based on the new failure being occurred, extracting a unique pattern determined to be a combination with a lowest occurrence rate from the combination of the plurality of failure events associated with the new failure and the failure event associated with at least one past failure that has occurred;
generating or correcting the rule according to the unique pattern corresponding to each failure;
acquiring an event mapping file defining a normalized alarm message indicating a normalized alarm content, a resource type indicating an event failure location, an alarm type, and an event type indicating event classification of the alarm in association with each other; and
determining whether input alarm information matches a definition of the event mapping file;
based on the input alarm information matching the definition, setting the event type to a value defined in the event mapping file;
based on the input alarm information does not matching the definition, setting the event type to the alarm type of alarm information; and
registering the event type and the alarm information in association with each other in the database as a failure event.

5. A non-transitory computer recording medium storing a program, wherein execution of the program causes one or more computers to perform operations comprising:
registering, in a database for an individual failure, failure factor information including a failure location and a failure factor, a failure event caused by the individual failure, and a rule name associated with a rule including a condition part and a conclusion part in association with each other;
generating at least one possible combination between a plurality of failure events associated with a new failure which is a newly generated failure;
based on the new failure being occurred, extracting a unique pattern determined to be a combination with a lowest occurrence rate from the combination of the plurality of failure events associated with the new failure and the failure event associated with at least one past failure that has occurred;
generating or correcting the rule according to the unique pattern corresponding to each failure;

acquiring an event mapping file defining a normalized alarm message indicating a normalized alarm content, a resource type indicating an event failure location, an alarm type, and an event type indicating event classification of the alarm in association with each other; and determining whether input alarm information matches a definition of the event mapping file;

based on the input alarm information matching the definition, setting the event type to a value defined in the event mapping file;

based on the input alarm information not matching the definition, setting the event type to the alarm type of alarm information; and registering the event type and the alarm information in association with each other in the database as a failure event.

6. The non-transitory computer recording medium according to claim 5, wherein the event type in the acquired event mapping file is selected from a predetermined definition file.

7. The non-transitory computer recording medium according to claim 5, wherein the operations further comprise:

changing the definition of the event mapping file, and updating a registered content in accordance with the event mapping file with changed the definition.

* * * * *